US011865377B2

(12) United States Patent
Shen et al.

(10) Patent No.: US 11,865,377 B2
(45) Date of Patent: Jan. 9, 2024

(54) SYSTEM AND METHOD FOR FIT TEST AND MONITORING FOR RESPIRATORY PRODUCTS

(71) Applicant: HONEYWELL INTERNATIONAL INC., Morris Plains, NJ (US)

(72) Inventors: Jennifer Shen, Morris Plains, NJ (US); Mark Hua, Morris Plains, NJ (US); Kevin Lu, Morris Plains, NJ (US); Bruce Liu, Morris Plains, NJ (US); Wei Sun, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 664 days.

(21) Appl. No.: 16/965,055

(22) PCT Filed: Feb. 14, 2018

(86) PCT No.: PCT/US2018/018094

§ 371 (c)(1),
(2) Date: Jul. 27, 2020

(87) PCT Pub. No.: WO2019/160535

PCT Pub. Date: Aug. 22, 2019

(65) Prior Publication Data

US 2021/0106854 A1 Apr. 15, 2021

(51) Int. Cl.
*A62B 27/00* (2006.01)
*A62B 7/10* (2006.01)
(Continued)

(52) U.S. Cl.
CPC ................ *A62B 27/00* (2013.01); *A62B 7/10* (2013.01); *A62B 9/006* (2013.01); *A62B 18/02* (2013.01); *A62B 18/08* (2013.01); *A62B 23/02* (2013.01)

(58) Field of Classification Search
CPC ........... A62B 27/00; A62B 7/10; A62B 9/006; A62B 18/02; A62B 18/025; A62B 18/08; A62B 23/02; A61M 16/0605; G01M 3/24
See application file for complete search history.

(56) References Cited

U.S. PATENT DOCUMENTS 8,573,199 B2 11/2013 King et al.
2007/0109138 A1* 5/2007 Farrell .................... G01M 3/24 340/605

(Continued)

FOREIGN PATENT DOCUMENTS

CA 2394217 C 1/2009
CN 105323694 A 2/2016

(Continued)

OTHER PUBLICATIONS

CN Office Action, including Supplemental Search Report, dated Feb. 7, 2022 for CN Application No. 201880088859, 9 pages.

(Continued)

*Primary Examiner* — Joseph D. Boecker
*Assistant Examiner* — Brian T Khong
(74) *Attorney, Agent, or Firm* — Alston & Bird LLP

(57) ABSTRACT

Embodiments include systems and methods for completing a fit test on a respiratory mask A method may comprise installing a speaker within an interior cavity of the face mask, wherein the speaker communicates with an electronics unit; installing a microphone within the interior cavity of the face mask, wherein the microphone communicates with the electronics unit; generating, by the speaker, a sound during the fit test; detecting, by the microphone, sound generated by the speaker during the fit test; comparing, by the electronics unit, a detected signal from the microphone to a baseline expected sound; when the detected signal is within a certain range of the baseline expected sound, indicating to the user that the fit test is completed and (Continued)

passed; and when the detected signal is not within a certain range of the baseline expected sound, indicating to the user that the fit test is completed and failed.

15 Claims, 11 Drawing Sheets

(51) Int. Cl.

| | |
|---|---|
| ***A62B 9/00*** | (2006.01) |
| ***A62B 18/02*** | (2006.01) |
| ***A62B 18/08*** | (2006.01) |
| ***A62B 23/02*** | (2006.01) |

(56) References Cited

U.S. PATENT DOCUMENTS

| | | | | |
|---|---|---|---|---|
| 2011/0270085 | A1* | 11/2011 | King | G01M 3/24 702/56 |
| 2013/0263857 | A1* | 10/2013 | Ahmad | A61M 16/024 128/205.23 |
| 2018/0008849 | A1* | 1/2018 | Baker | G01M 3/3218 |
| 2018/0078798 | A1* | 3/2018 | Fabian | A61B 5/0816 |

FOREIGN PATENT DOCUMENTS

| | | |
|---|---|---|
| CN | 106215346 A | 12/2016 |
| CN | 106457005 A | 2/2017 |
| DE | 102010031961 B4 | 5/2015 |

OTHER PUBLICATIONS

English Translation of CN Office Action dated Feb. 7, 2022 for CN Application No. 201880088859, 9 pages.
CN Notice of Allowance dated Nov. 2, 2022 for CN Application No. 201880088859.
English translation of CN Notice of Allowance dated Nov. 2, 2022 for CN Application No. 201880088859.
IPEA/409—International Preliminary Report on Patentability (Chapter I) dated Aug. 18, 2020 for WO Application No. PCT/US18/018094.
Outgoing Written Opinion of the ISA dated Jul. 12, 2018 for WO Application No. PCT/US18/018094.
CN Office Action dated Aug. 2, 2022 for CN Application No. 201880088859, 3 pages.
English Translation of CN Office Action dated Aug. 2, 2022 for CN Application No. 201880088859, 4 pages.
International Search Report of the International Searching Authority for PCT/US2018/018094 dated Jul. 12, 2018.
CN Office Action, including Search Report, dated May 8, 2021 for CN Application No. 201880088859, 10 pages.
English Translation of CN Office Action, including Search Report, dated May 8, 2021 for CN Application No. 201880088859, 14 pages.

* cited by examiner

SYSTEM AND METHOD FOR FIT TEST AND MONITORING FOR RESPIRATORY PRODUCTS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The use of respiratory masks is a recommended practice in certain work environments to help prevent the inhalation of small particles, dust, or chemicals and to prevent the spread of disease. Also, respiratory masks may be worn to protect people by filtering airborne contaminants and micro-organisms in the ambient air, especially in areas with heavy smog. Respiratory masks may comprise a plurality of filtering options, depending on the application of the masks. Some respiratory masks may comprise half-masks, operable to cover the nose and mouth of a user.

Respiratory masks may also be worn by a user to protect the user's face and eyes, as well as the user's respiratory system. Respiratory masks may comprise filtering cartridges, inhalation valves, exhalation valves, protective shields, and head straps. To ensure that a respirator mask is being worn correctly and protecting the user, fit tests may be conducted when the mask is first donned by a user, before the user enters a hazardous environment.

SUMMARY

In an embodiment, a method for completing a fit test on a face mask may comprise generating, by a speaker, a sound for a predetermine length of time during the fit test, wherein the speaker is installed within an interior cavity of the face mask, wherein the speaker is configured to communicate with an electronics unit of the face mask; detecting, by a microphone, sound generated by the speaker during the fit test, wherein the microphone is installed within the interior cavity of the face mask, wherein the microphone is configured to communicate with the electronics unit of the face mask; comparing, by the electronics unit, a detected signal from the microphone to a baseline expected sound; when the detected signal is within a certain range of the baseline expected sound, indicating to the user that the fit test is completed and passed; and when the detected signal is not within a certain range of the baseline expected sound, indicating to the user that the fit test is completed and failed.

In an embodiment, a respiratory face mask may comprise at least one filter element configured to filter the airflow into the face mask to generate breathable air for a user; a seal configured to seal the mask against the user's face; at least one speaker located within an interior cavity of the mask configured to generate a sound to complete a fit test for the mask; at least one microphone located within the interior cavity of the mask configured to detect sound generated by the at least one speaker during the fit test for the mask, wherein when the sound detected by the microphone is decreased from a baseline expected sound, the mask is configured to indicate that the fit test has failed; and an electronics unit configured to communicate with and control the at least one speaker and at least one microphone to complete the fit test for the mask.

In an embodiment, a method for completing a fit test on a face mask may comprise initiating the fit test by an input from the user; generating a sound, by a speaker installed within an interior cavity of the face mask, wherein the speaker is configured to communicate with an electronics unit of the face mask; detecting at least a portion of the sound generated by the speaker, by a microphone installed within the interior cavity of the face mask, wherein the microphone is configured to communicate with the electronics unit of the face mask; comparing, by the electronics unit, a detected signal from the microphone to a baseline expected sound; when the detected signal is within a certain range of the baseline expected sound, indicating to the user that the fit test is completed and passed; and when the detected signal is not within a certain range of the baseline expected sound, indicating to the user that the fit test is completed and failed.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
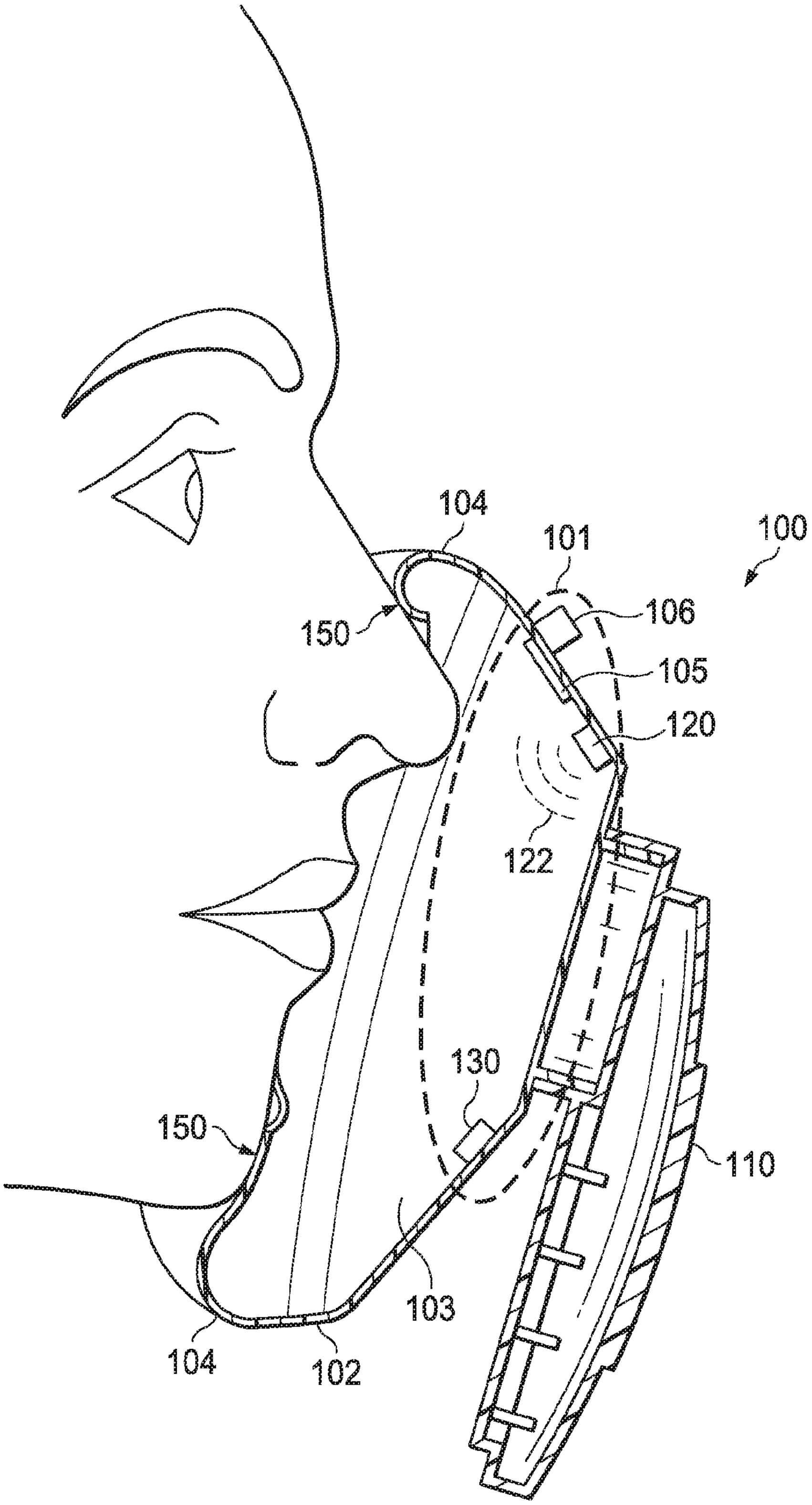
FIG. 1 illustrates a cross-sectional view of a face mask worn by a user according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term “comprising” means including but not limited to, and should be interpreted in the manner it is typically used in the patent context;

The phrases “in one embodiment,” “according to one embodiment,” and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as “exemplary” or an “example,” it should be understood that refers to a non-exclusive example;

The terms “about” or “approximately” or the like, when used with a number, may mean that specific number, or alternatively, a range in proximity to the specific number, as understood by persons of skill in the art field; and If the specification states a component or feature “may,” “can,” “could,” “should,” “would,” “preferably,” “possibly,” “typically,” “optionally,” “for example,” “often,” or “might” (or other such language) be included or have a characteristic, that particular component or feature is not required to be included or to have the characteristic. Such component or feature may be optionally included in some embodiments, or it may be excluded.

Embodiments of the disclosure include systems and methods for completing a fit test for respiratory equipment, e.g., a respiratory face mask configured to seal with a user's face. An exemplary system may comprise one or more speakers and one or more microphones located on the respiratory face mask. Due to possible air pollution in cities and work environments, protective respiratory face masks (e.g., anti-dust masks) are becoming essential equipment when outdoors. However, the protection of an anti-dust mask may be compromised if the mask does not fit a user's face, and therefore does not seal against the user's face. To ensure a mask fits a user's face (and is therefore sealed against a user's face), fit tests may be completed, for example when a user first dons a mask.

Typical fit test instruments may be located in labs and may be expensive, limiting the availability of the fit test instruments to users. Additionally, typical fit test instruments may be large and bulky, making maneuvering the fit test instruments and completing the fit tests difficult. The fit test instruments may also involve complex processes to operate and may take a long time to complete fit tests. Typical fit test instruments cannot practically be used by an everyday consumer who wants to protect themselves from air pollution. A fit test and monitoring method is needed that can be completed conveniently, where people are wearing protective masks.

Embodiments of the disclosure include acoustic fit test systems and methods for testing the fit (and seal) between a mask and a user's face (or head). If there is a gap between the mask and the user's face (i.e., the mask does not fit properly), the mask may not seal against the user's face and therefore may not protect the user from polluted air and potentially harmful substances. The disclosed methods and systems for implementing the methods may utilize sound (e.g., sound generated by a speaker within the mask and detected by a microphone) to detect any gaps in the seal between the mask and the user's face. For example, when the mask is not sufficient sealed, a sound generated within the mask will leak out of the gaps in the seal.

In an exemplary embodiment, a speaker may be located on an interior surface of the mask and may be configured to produce a sound inside of the mask. Additionally, a microphone may be located on the interior surface of the mask and may be configured to detect the sound produced by the speaker. If there are any gaps in the seal between the user's face and the mask, the microphone will detect an attenuated (i.e., weakened) sound. In some embodiments, the speaker may produce a sound between approximately 20 to 20,000 Hertz (i.e., the audible frequency range). When there is a gap between the mask and face, there will be sound leakage at the gap, and the microphone will detect an attenuated sound, indicating that the mask is not fitting properly. Additionally, if there is no attenuation detected by the microphone, it may indicate that the mask is fitting properly. As all respiratory products would benefit from fit testing, the systems and methods of the disclosure can be applied to any respiratory equipment, including full masks and half masks, for example.

Referring to FIG. 1, an exemplary embodiment of a face mask 100 is shown, wherein the face mask 100 may be configured to seal against the face 150 of a user. The mask 100 shown in FIG. 1 illustrates a half-mask, configured to cover the user's nose and mouth, but the embodiments disclosed herein may also apply to a full mask, configured to cover the user's entire face, and/or a helmet, configured to cover the user's entire head. In some embodiments, the face mask 100 may comprise a seal 104 extending around at least a portion of the face mask 100. In the embodiment shown in FIG. 1, the seal 104 may comprise a flexible element extending around the entire circumference (or outer edge) of the face mask 100, where the seal 104 may be shaped to fit against a user's face 150. The seal 104 may comprise contours configured to interface with the nose, cheeks, chin, and/or jaw of the user. The seal 104 may be attached to a main body 102 of the face mask 100, where the main body 102 may be configured to attach to one or more filter elements 110 configured to filter the air breathed by the user. The filter elements 110 may include filtering material, one or more vents, one or more airflow pathways, one or more valves, one or more airflow generators (e.g., a fan), among other filter elements 110 that may be known to those of skill in the art.

The main body 102 of the face mask 100 may comprise an interior cavity 103 configured to fit over the user's nose and mouth, and configured to provide the filtered breathable air to the user. In the embodiment shown in FIG. 1, a speaker 120 (or other sound generating element) may be attached within the interior cavity 103 of the main body 102 of the face mask 100. Additionally, a microphone 130 (or other sound detection element) may be attached within the interior cavity 103 of the main body 102 of the mask 100. The speaker 120 and microphone 130 may both be positioned to not interfere with the airflow into or out of the mask 100. The speaker 120 and microphone 130 may communicate with and be controlled by an electronics unit 105 of the face mask 100.

In some embodiments, the electronics unit 105 may comprise a processor, a memory, one or more communication elements, and/or one or more wireless communication elements, among other things. To complete a fit test on the face mask 100, to ensure the seal 104 is properly in contact with the user's face 150, the speaker 120 may generate a certain sound (indicated by sound waves 122) for a predetermined amount of time (where the speaker 120 may be controlled by the electronics unit 105). For example, the speaker 120 may generate a sound for approximately 1 to 5 seconds, during a "fit test" period that may be indicated to the user. The microphone 130 may detect the sound generated by the speaker 120, and may communicate a signal to the electronics unit 105. In some embodiments, the electronics unit 105 may store a baseline expected sound to be detected by the microphone 130. In some embodiments, the baseline expected sound to be detected by the microphone 130 may be determined based on a controlled output of the speaker 120 (i.e., the sound generated by the speaker 120). In some embodiments, the baseline expected sound to be detected by the microphone 130 may be determined based on testing before the mask 100 is put into operation.

In some embodiments, a user may initiate a fit test manually, for example, by pressing a button on the mask 100, thereby communicating that the fit test should be started. In some embodiments, the fit test may be automatically started when a user dons the mask 100, where the mask 100 may be configured to determine when the mask 100 is donned by the user. In some embodiments, the mask 100 may comprise a voice activation feature configured to detect voice commands from the user, where a user may initiate the fit test using a voice command. In some embodiments, the microphone 130 may be configured to detect a user's voice (to receive voice commands from the user), and may be configured to switch into a "fit test" mode during the fit test. In other words, the microphone 130 may serve more than one purpose or function within the mask 100. In another embodiment, more than one microphone may be used in the mask 100.

FIG. 1 illustrates an example of a correct fit, where none of the sound generated by the speaker 120 is escaping the interior cavity 103 of the mask 100. In some embodiments, during a fit test, an indicator 106 may be used to communicate the status of the fit test to the user. The indicator 106 may comprise a light element (e.g., an LED), a sound producing element (e.g., voice feedback, a buzzer, and/or an alert or alarm), or another indicator configured to communicate information to the user. The indicator 106 may comprise a first state configured to indicate that the fit test is starting and/or current in progress. The indicator 106 may comprise a second state configured to indicate that the fit test has completed and is passed (i.e., indicating proper fit and seal of the face mask 100). The indicator 106 may comprise a third state configured to indicate that the fit test has completed and is failed (i.e., indicating improper fit and seal of the face mask 100, and possibly prompting the user to adjust the fit of the mask 100 and seal 104). The indicator 106 may comprise a fourth state that may indicate an "off" status, where the fit test method is not being completed on the mask 100. The indicator 106 may comprise other states of indication which may only be limited by the type of indicator and the capabilities of the indicator. The indicator 106 may communicate with and be controlled by the electronics unit 105. The indicator 106 may indicate the current status of the speaker 120 and/or microphone 130 and their operation within the mask 100. In some embodiments, the speaker 120, microphone 130, indicator 106, and electronics unit 105 may be part of an electronics system 101 that is incorporated into the mask 100 and configured to complete a fit test on the mask 100.

Figure 2:
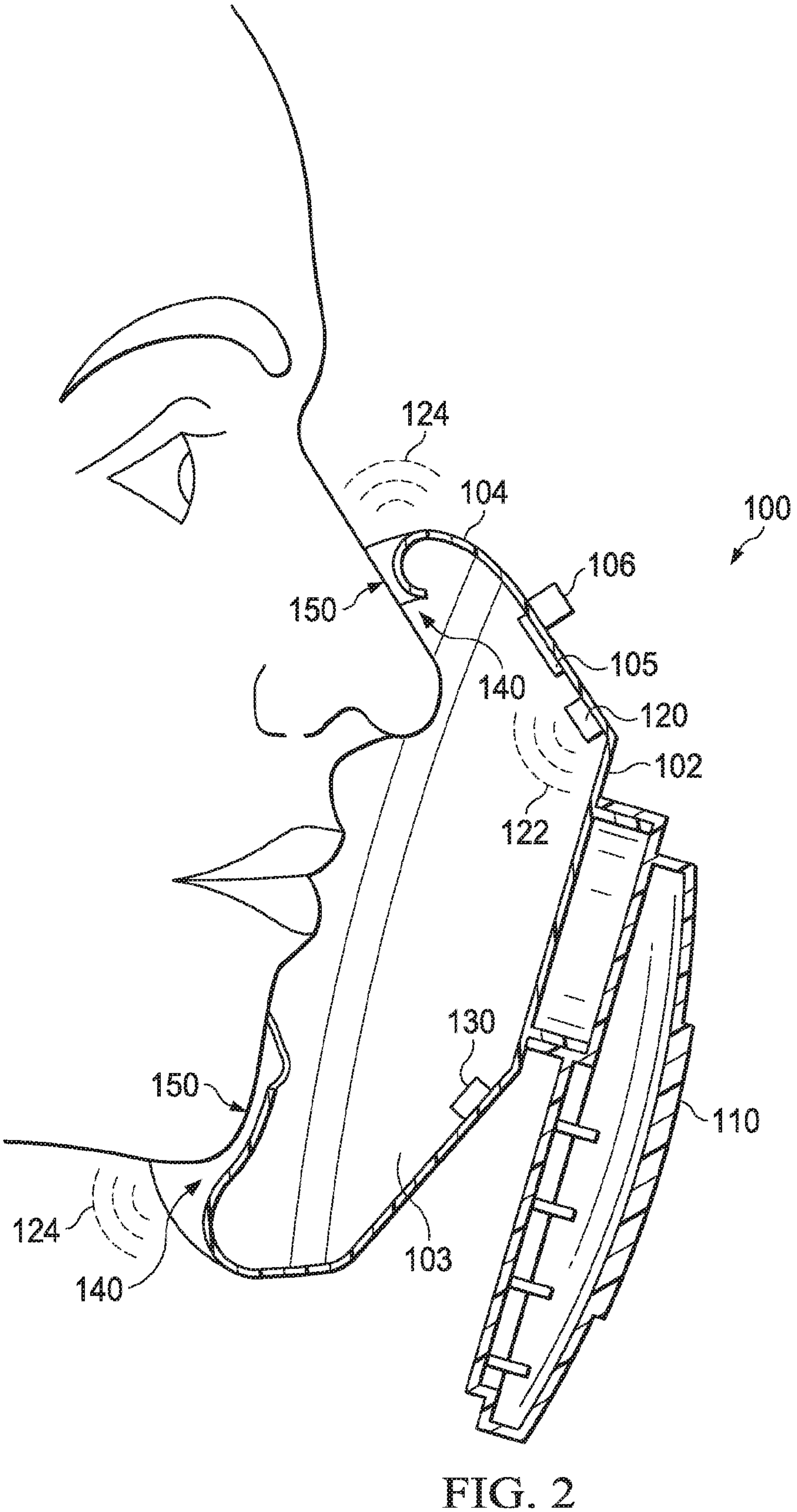
FIG. 2 illustrates another cross-sectional view of a face mask worn by a user with an improper fit according to an embodiment of the disclosure.

Referring to FIG. 2, when the sound detected by the microphone 130 is different from the baseline expected sound, this may indicate that the seal 104 is not properly fitted and/or sealed to the user's face 150. For example, an improper fit may cause one or more gaps 140 between the seal 104 and the user's face 150, wherein sound waves 124 may escape the interior cavity 103 of the mask 100 via the gap 140. The sounds waves 124 that escape the interior cavity 103 may therefore not be detected by the microphone 130, thereby reducing the sound pressure that is detected by the microphone 130. In other words, a reduced (i.e., attenuated or weakened) sound (when compared to the baseline expected sound) may be detected by the microphone 130, indicating that the fit of the face mask 100 is not correct, thereby causing a "fail" of the fit test.

Embodiments of the disclosure may include a method for completing a fit test on a face mask 100 (as described above). A microphone 130 and speaker 120 may be installed within the interior cavity 103 of the mask 100. The speaker 120 may generate a specific sound (e.g., once at the beginning of the fit test, continuously for a set period of time, and/or periodically as needed). The microphone 130 may detect the sound generated by the speaker 120, and the output signal from the microphone 130 may be analyzed (by the electronics unit 105) to determine if there is sound leakage (indicating a gap 140 at the seal 104 between the user's face 150 and the mask 100) or no sound leakage (indicating a proper seal between the seal 104 and the user's face 150). In some embodiments, the mask 100 may comprise an indicator 106 of some kind to indicate the status of the fit test to the user. For example, an LED may be incorporated into the mask 100 where the user can view the LED, where certain colors may indicate that the mask 100 is properly fit or not properly fit. In another embodiment, the indicator 106 may comprise a voice indication that may be heard by the user. In some embodiments, the fit test may be completed during a short time period (i.e., approximately 10 seconds or less) when the user first dons the mask 100, where the user may be asked to (or expected to) not speak and possibly hold their breath during the fit test, so as not to interfere with the detection of the microphone 130.

Figure 3:
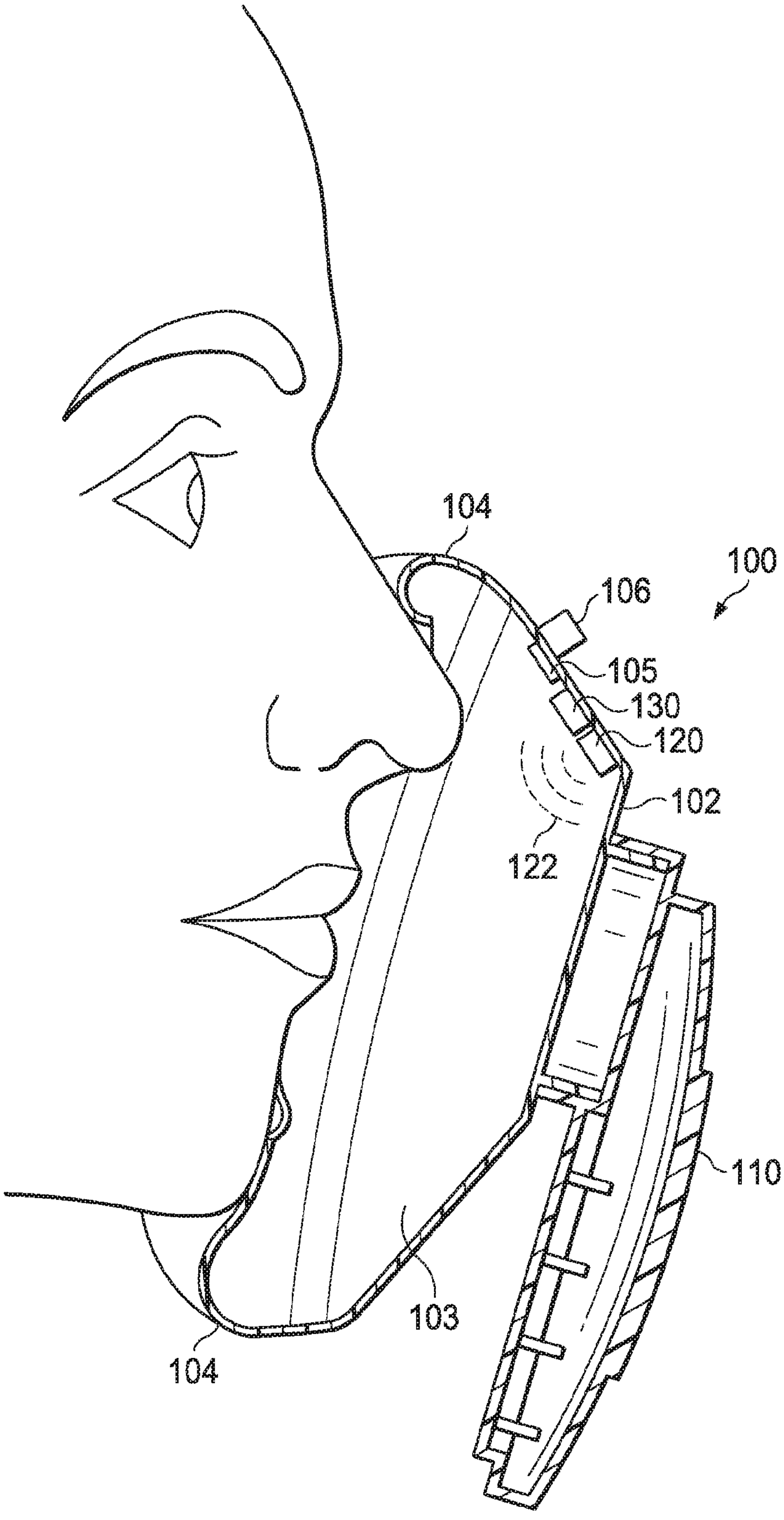
FIG. 3 illustrates a cross-sectional view of another face mask worn by a user according to an embodiment of the disclosure.

Referring to FIG. 3, another exemplary system for completing a fit test on a respiratory face mask 100 is shown. In the embodiment shown in FIG. 3, the microphone 130 and speaker 120 may be located above the nose area within the interior cavity 103 of the mask 100, where the breath airflow impact may be minimized. The position of the microphone 130 and the speaker 120 may be selected to improve the accuracy of the fit test and reduce the impact of other sounds within the mask 100 on the results of the fit test.

Figure 4:
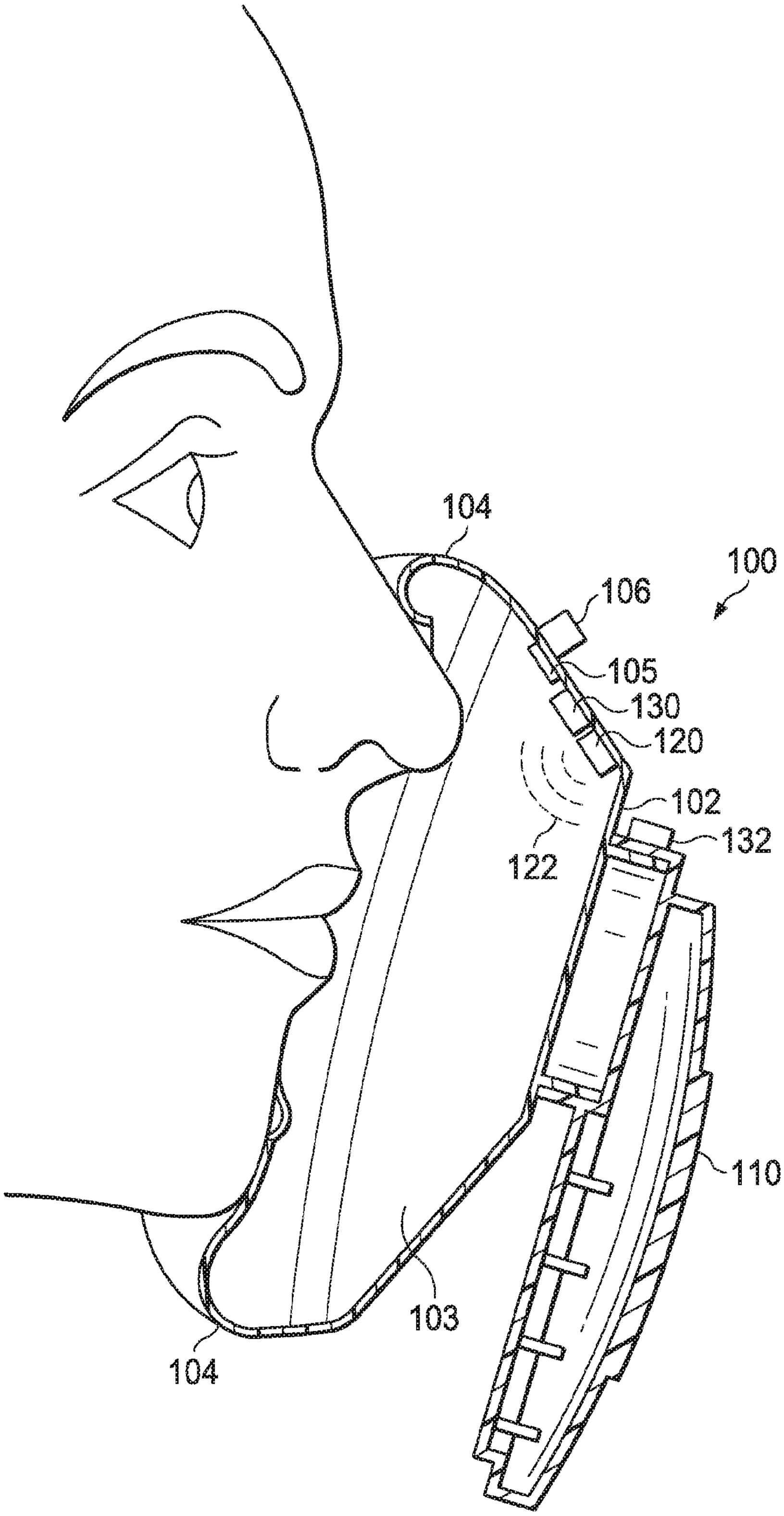
FIG. 4 illustrates a cross-sectional view of another face mask worn by a user according to an embodiment of the disclosure.

Referring to FIG. 4, yet another exemplary system for completing a fit test on a respiratory face mask 100 is shown. In the embodiment shown in FIG. 4, the microphone 130 and speaker 120 may be located above the nose within the interior cavity 103 of the mask 100 (similar to FIG. 3), and a second microphone 132 may be located on the exterior of the mask 100. The second microphone 132 located on the exterior of the mask 100 may be configured to detect environmental noise and provide a cancellation of this environmental noise from the detection of the first microphone 130, thereby increasing the accuracy of the first microphone in detecting the output from the speaker 120. The second microphone 132 may be especially useful while the user is working or located in a noisy environment.

Figure 5:
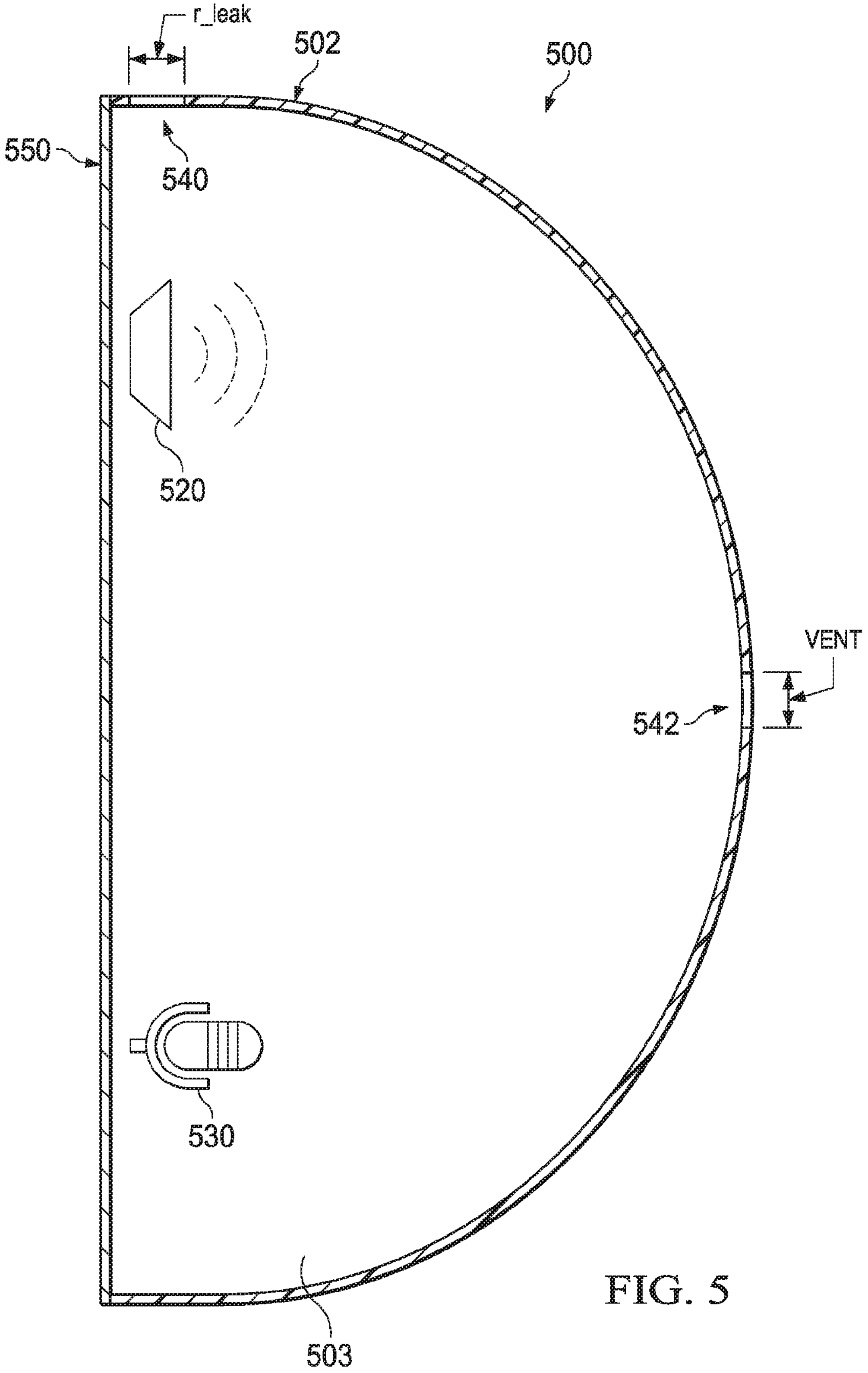
FIG. 5 illustrates a cross-sectional view of a model of a face mask for testing according to an embodiment of the disclosure.

Referring now to FIG. 5, to illustrate the operation of the methods and systems described above in FIGS. 1-4, a model 500 of a face mask (such as the face mask 100 described above) was used to determine the relationship between the sound produced by a speaker 520, the sound detected by a microphone 530, and the size (or radius, r_leak) of a leakage-hole 540 located proximate to where the main body 502 of the mask would seal with the user's face (illustrated by hard surface 550). The geometry of the model 500 may be simplified for illustrative purposes. The microphone 530 and speaker 520 may be located within the interior cavity 503 of the mask 500. In some embodiments, the mask 500 may also comprise a vent hole 542 configured to represent the connection point between the main body 502 of the mask 500 and any filter elements (as described in FIG. 1). For the purposes of testing the model 500, the user's face 550 and the main body 502 of the mask 500 may be "sound hard" surfaces or boundaries, configured to retain the sound within the interior cavity 503.

Figure 6A:
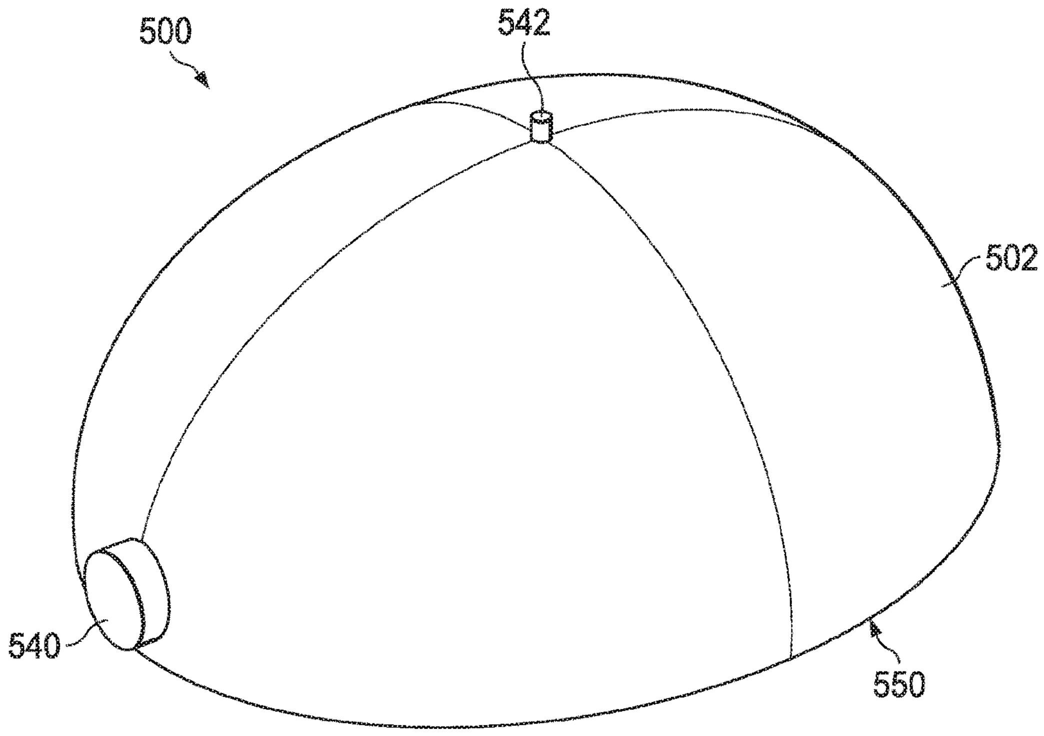
FIG. 6A illustrates a perspective view of a model of a face mask for testing according to an embodiment of the disclosure.
Figure 6B:
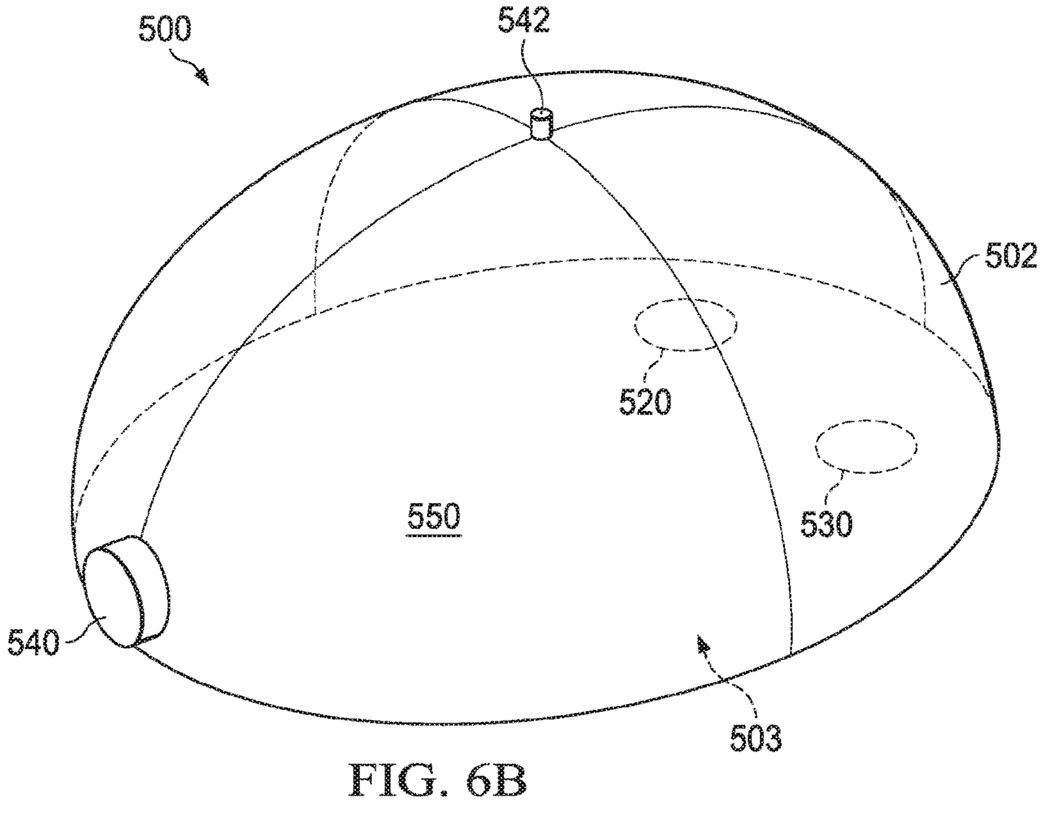
FIG. 6B illustrates a transparent view of a model of a face mask for testing according to an embodiment of the disclosure.

FIGS. 6A-6B illustrate perspective views of the model 500, where FIG. 6B is shown with the main body 502 in transparency. In the embodiment shown in FIGS. 6A-6B, the vent hole 542 may have a diameter of approximately 2 millimeters (mm). The leakage-hole 540 may be represented by a circular hole with a radius of r_leak, which may range from approximately 0 mm to approximately 5 mm. In the model 500 shown in FIGS. 6A-6B, the length of the leakage-hole 540 may be approximately 2 mm, and the length of the vent hole 542 may be approximately 2 mm.

The output of the speaker 520 may be equivalent to a constant 1 Pascal (Pa) sound source over the interior cavity 503 area. The microphone 530 may be equivalent to an area for detecting sound. The shape of the model 500 may be an approximately ellipsoid shape with three semi-axes, 50 mm, 40 mm, and 40 mm, respectively.

Figure 7:
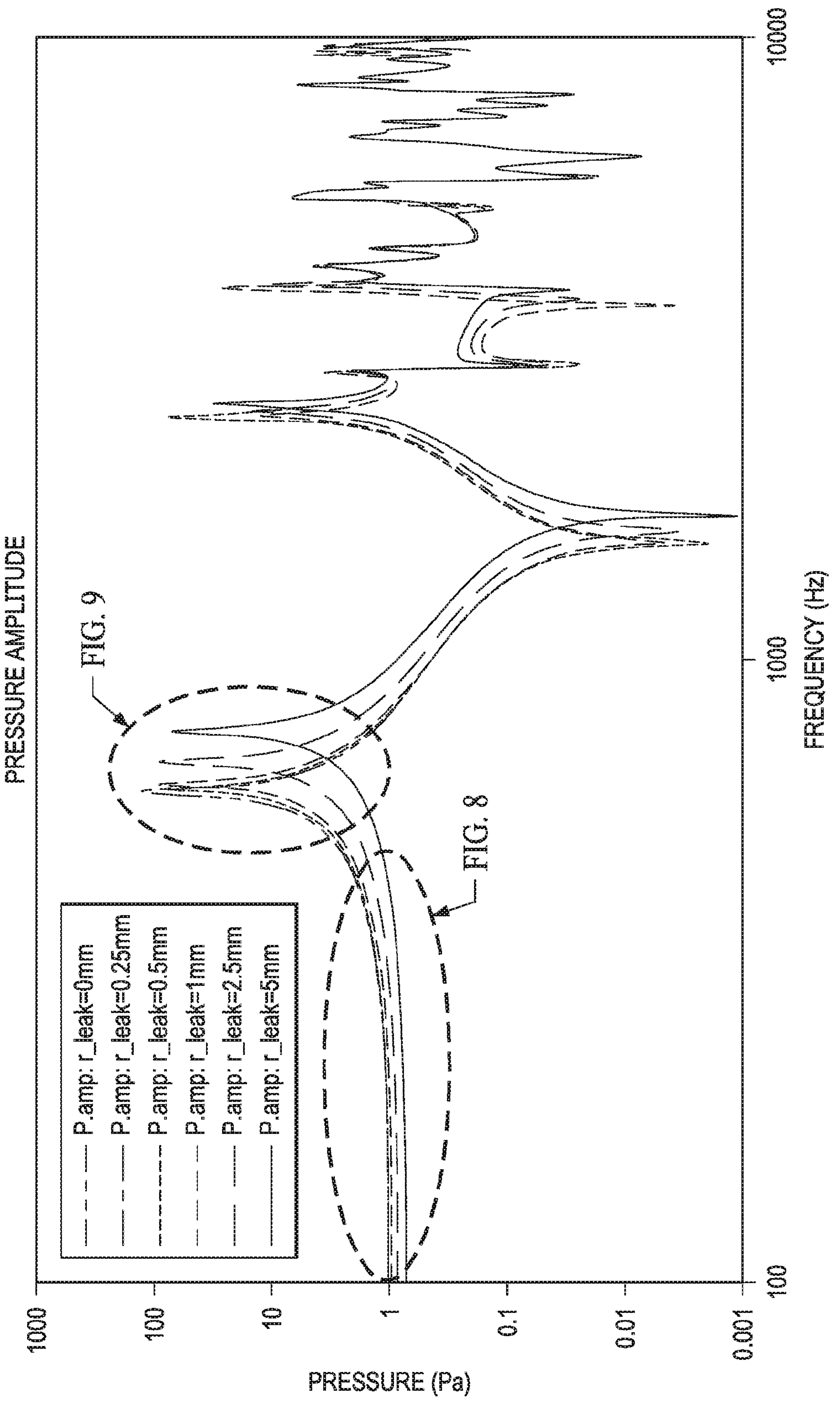
FIG. 7 illustrates a graph of test results completed using the model of a face mask shown in FIGS. 6A-6B illustrating the relationship between pressure amplitude and frequency of sound detected by a microphone at a plurality of leakage-hole sizes.

FIG. 7 illustrates a graph of test results completed using the model of a face mask shown in FIGS. 6A-6B illustrating pressure amplitude and frequency of sound detected by a microphone at a plurality of leakage-hole sizes. The sizes of r_leak that were tested included 0 mm, 0.25 mm, 0.5 mm, 1 mm, 2.5 mm, and 5 mm, where each size is represented by a different line on the graph. The frequency range of interest includes 100 to 10,000 Hertz (Hz).

Figure 8:
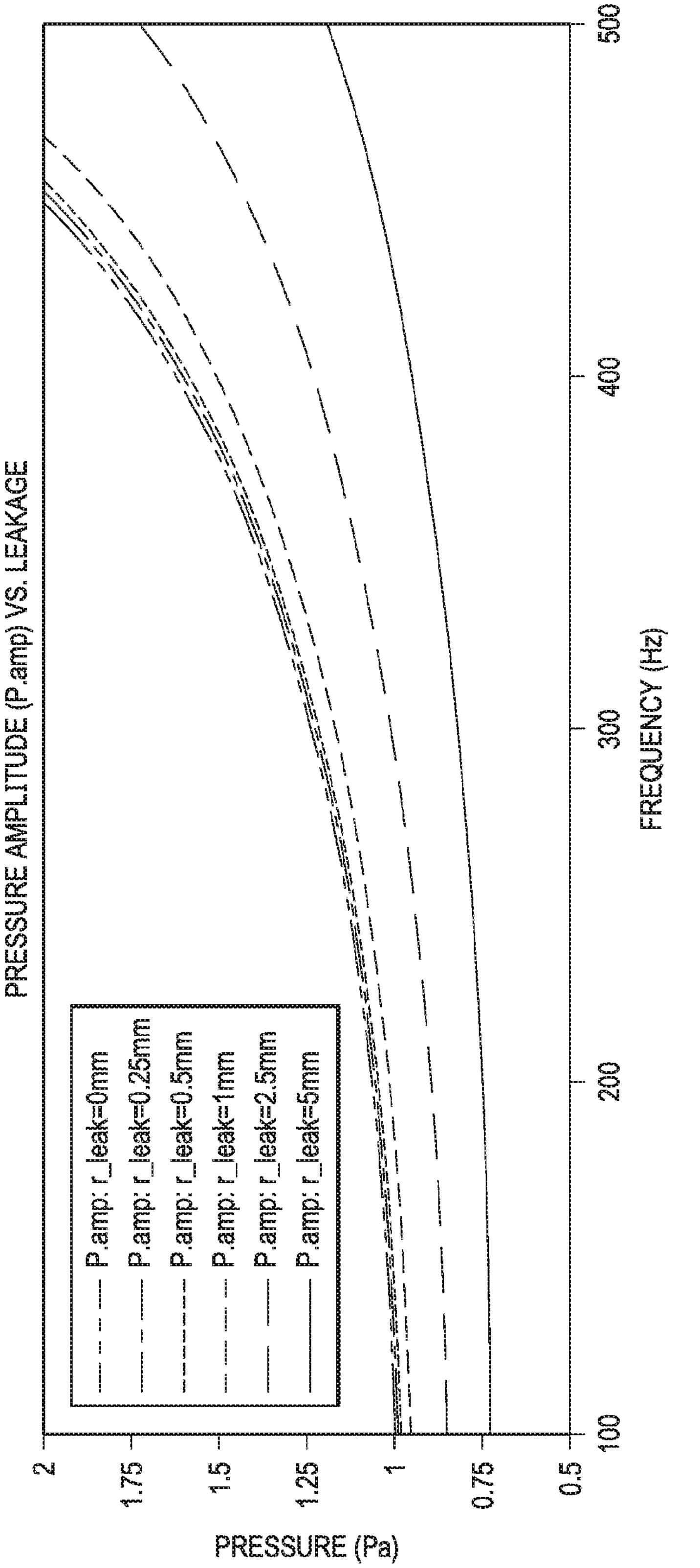
FIG. 8 illustrates a detailed view of a portion of the graph shown in FIG. 7 illustrating the pressure amplitude dependency on the leakage-hole size.

FIG. 8 illustrates a detailed view of a portion of the graph shown in FIG. 7 illustrating the pressure amplitude dependency on the leakage-hole size, wherein the graph of FIG. 8 focuses on the frequency range of 100 to 500 Hz.

Figure 9:
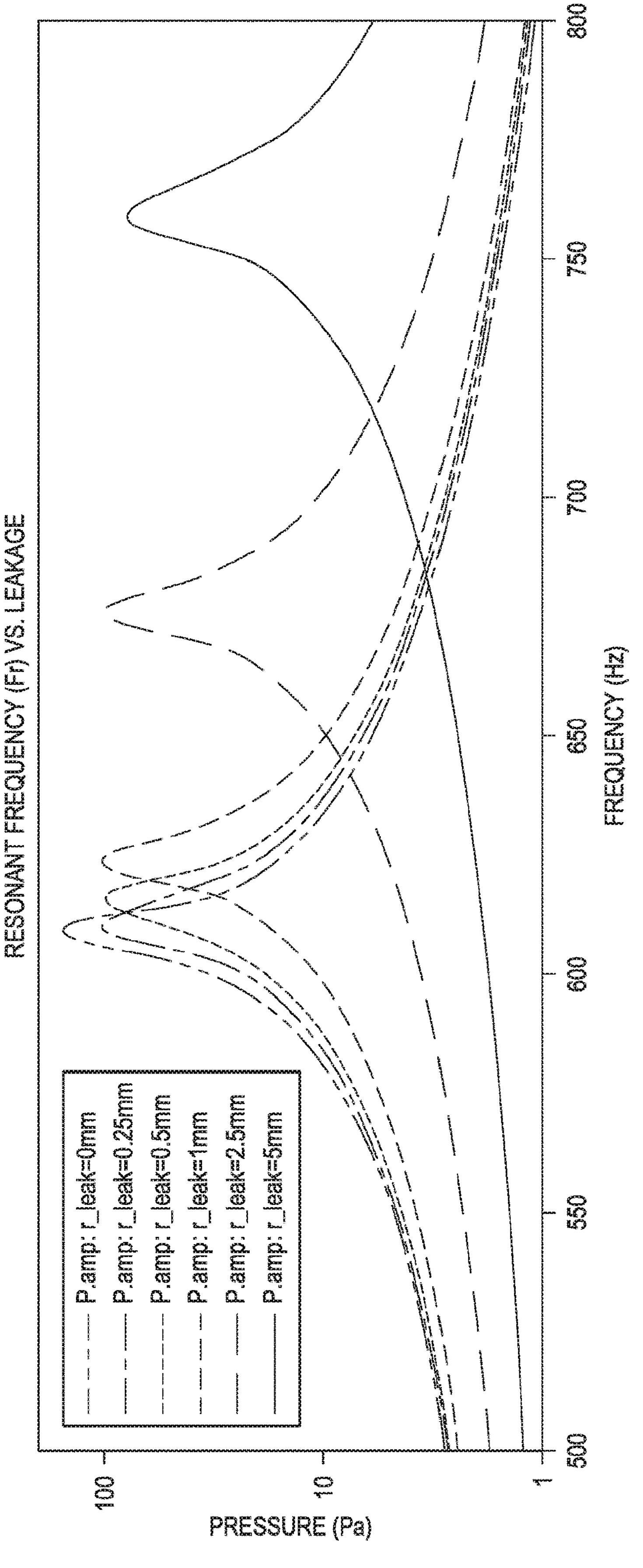
FIG. 9 illustrates a detailed view of a portion of the graph shown in FIG. 7 illustrating the resonant frequency for each of the leakage-hole sizes.

FIG. 9 illustrates a detailed view of a portion of the graph shown in FIG. 7 illustrating the resonant frequency for each of the leakage-hole sizes, where the graph of FIG. 9 focuses on the frequency range of 500 to 800 Hz.

Figure 10:
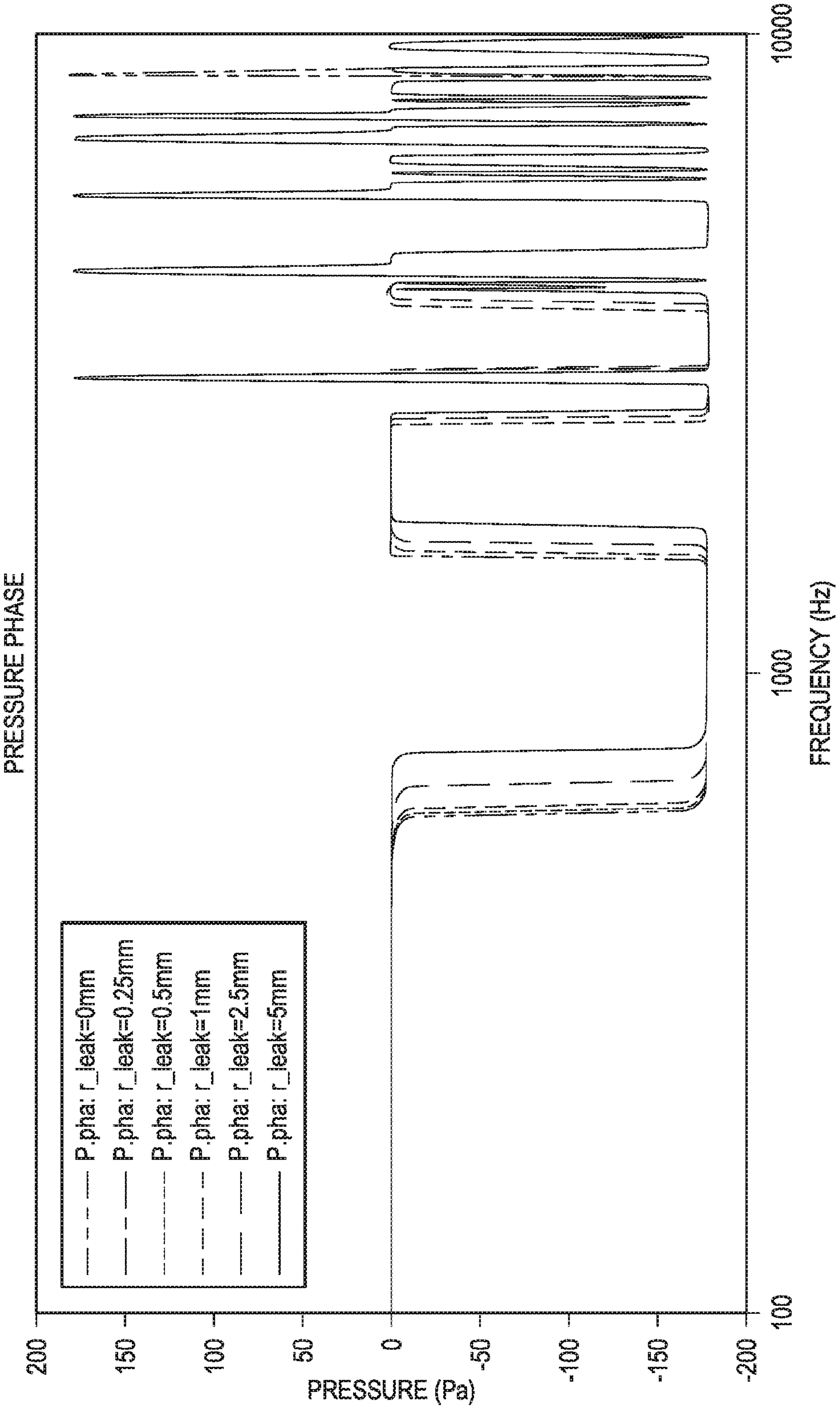
FIG. 10 illustrates a graph of test results completed using the model of a face mask shown in FIGS. 6A-6B illustrating the relationship between pressure phase and frequency of sound detected by a microphone at a plurality of leakage-hole sizes.

FIG. 10 illustrates a graph of the test results completed using the model of a face mask shown in FIGS. 6A-6B, where the graph in FIG. 10 illustrates the relationship between pressure phase and frequency of sound produced by a speaker at a plurality of leakage-hole sizes.

Figure 11:
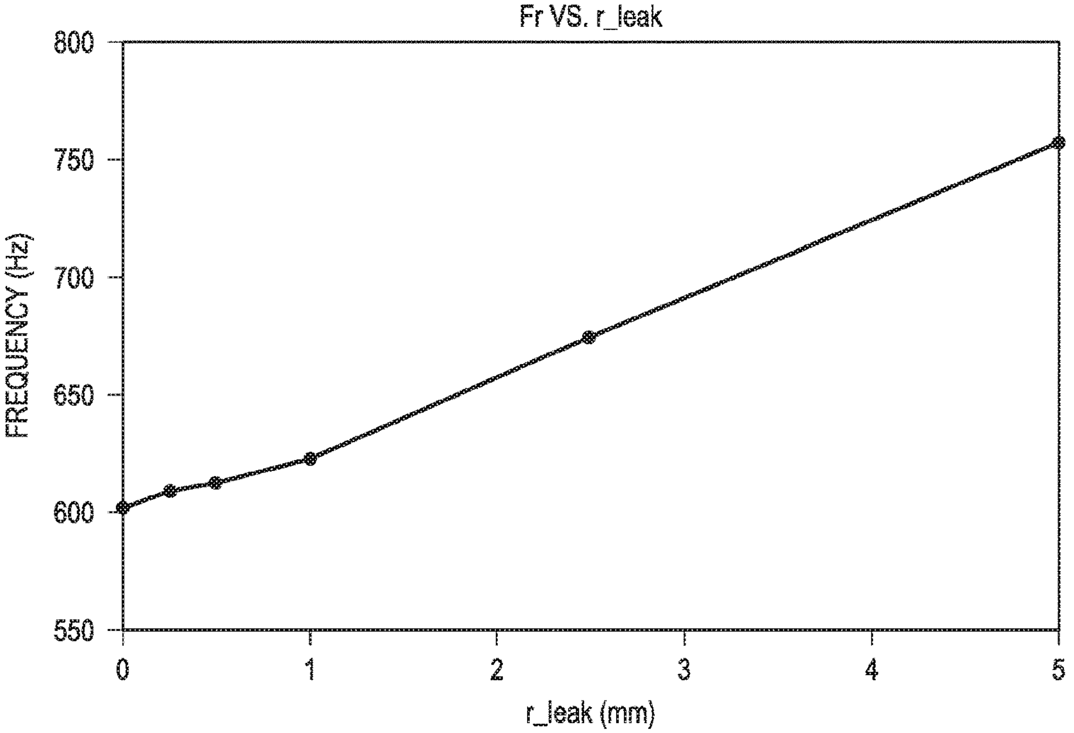
FIG. 11 illustrates a graph of the data shown in FIG. 7 illustrating the dependence of the resonant frequency of sound detected by the microphone on the radius of the leakage-hole (r_leak).

FIG. 11 illustrates a graph of the data shown in FIG. 7 illustrating the dependence of the resonant frequency of sound detected by the microphone on the radius of the leakage-hole (r_leak).

Figure 12:
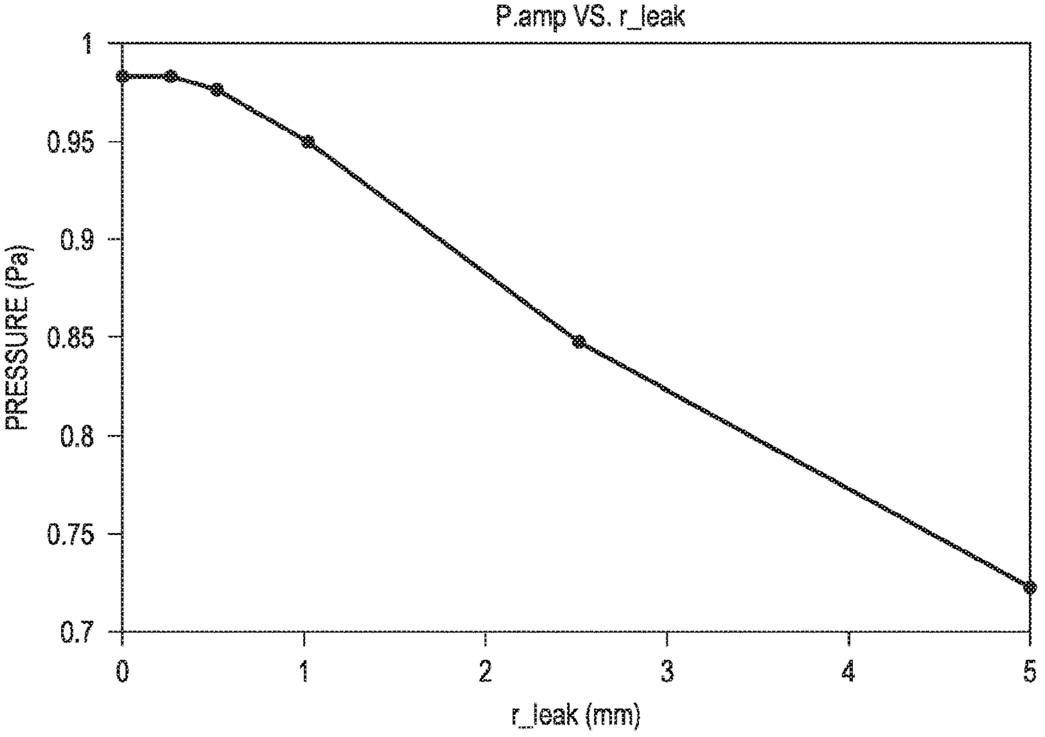
FIG. 12 illustrates a graph of the data shown in FIG. 7 illustrating the dependence of the pressure amplitude of sound detected by the microphone on the radius of the leakage-hole (r_leak).

FIG. 12 illustrates a graph of the data shown in FIG. 7 illustrating the dependence of the pressure amplitude of sound detected by the microphone on the radius of the leakage-hole (r_leak).

The graphs of FIGS. 11 and 12 illustrate that both the pressure amplitude at low frequency and the first resonant frequency (within the range of 100 Hz to approximately 1000 Hz) are dependent on r_leak. Therefore, during a fit test, these two variables may be used to estimate the leakage level (i.e., from a gap in the seal between the mask and the user's face).

Having described various devices and methods herein, exemplary embodiments or aspects can include, but are not limited to:

In a first embodiment, a method for completing a fit test on a face mask may comprise generating, by a speaker, a sound for a predetermine length of time during the fit test, wherein the speaker is installed within an interior cavity of the face mask, wherein the speaker is configured to communicate with an electronics unit of the face mask; detecting, by a microphone, sound generated by the speaker during the fit test, wherein the microphone is installed within the interior cavity of the face mask, wherein the microphone is configured to communicate with the electronics unit of the face mask; comparing, by the electronics unit, a detected signal from the microphone to a baseline expected sound; when the detected signal is within a certain range of the baseline expected sound, indicating to the user that the fit test is completed and passed; and when the detected signal is not within a certain range of the baseline expected sound, indicating to the user that the fit test is completed and failed.

A second embodiment can include the method of the first embodiment, further comprising receiving input from a user to start the fit test before the speaker generates the sound.

A third embodiment can include the method of the first or second embodiment, further comprising sealing the face mask to a user's face via a seal located about an outer edge of the face mask.

A fourth embodiment can include the method of any of the first through third embodiments, wherein generating a sound by the speaker comprises generating a sound for approximately 10 seconds or less.

A fifth embodiment can include the method of any of the first through fourth embodiments, wherein generating a sound by the speaker comprises generating a sound for approximately 1 to 5 seconds.

A sixth embodiment can include the method of any of the first through fifth embodiments, wherein indicating to a user that the fit test is completed and passed and indicating to the user that the fit test is completed and failed comprises indicating via a colored light attached to the exterior of the mask.

A seventh embodiment can include the method of any of the first through sixth embodiments, wherein indicating to a user that the fit test is completed and passed and indicating to the user that the fit test is completed and failed comprises indicating via voice feedback.

An eighth embodiment can include the method of any of the first through seventh embodiments, further comprising repeating the method until the fit test is completed and passed.

A ninth embodiment can include the method of any of the first through eighth embodiments, further comprising detecting, by a second microphone, environmental noise, wherein the second microphone is installed on the exterior of the mask; and canceling, by the electronics unit, detected environmental noise in a detected signal from the second microphone from the detected signal from the first microphone.

In a tenth embodiment, a respiratory face mask may comprise at least one filter element configured to filter the airflow into the face mask to generate breathable air for a user; a seal configured to seal the mask against the user's face; at least one speaker located within an interior cavity of the mask configured to generate a sound to complete a fit test for the mask; at least one microphone located within the interior cavity of the mask configured to detect sound generated by the at least one speaker during the fit test for the mask, wherein when the sound detected by the microphone is decreased from a baseline expected sound, the mask is configured to indicate that the fit test has failed; and an electronics unit configured to communicate with and control the at least one speaker and at least one microphone to complete the fit test for the mask.

An eleventh embodiment can include the respiratory face mask of the tenth embodiment, further comprising an indicator located on the exterior of the mask configured to indicate the status of the fit test to the user.

A twelfth embodiment can include the respiratory face mask of the eleventh embodiment, wherein the indicator comprises a colored light attached to the exterior of the mask.

A thirteenth embodiment can include the respiratory face mask of the eleventh or twelfth embodiments, wherein the indicator comprises voice feedback.

A fourteenth embodiment can include the respiratory face mask of any of the tenth through thirteenth embodiments, wherein the at least one microphone comprises a microphone configured to detect voice commands from the user.

A fifteenth embodiment can include the respiratory face mask of any of the tenth through fourteenth embodiments, wherein the at least one microphone comprises a first microphone located within the interior cavity of the mask; and a second microphone located on an exterior of the mask configured to detect environment noise, wherein the detection of the second microphone is used to cancel environmental noise from the detection of the first microphone.

In a sixteenth embodiment, a method for completing a fit test on a face mask may comprise initiating the fit test by an input from the user; generating a sound, by a speaker installed within an interior cavity of the face mask, wherein the speaker is configured to communicate with an electronics unit of the face mask; detecting at least a portion of the sound generated by the speaker, by a microphone installed within the interior cavity of the face mask, wherein the microphone is configured to communicate with the electronics unit of the face mask; comparing, by the electronics unit, a detected signal from the microphone to a baseline expected sound; when the detected signal is within a certain range of the baseline expected sound, indicating to the user that the fit test is completed and passed; and when the detected signal is not within a certain range of the baseline expected sound, indicating to the user that the fit test is completed and failed.

A seventeenth embodiment can include the method of the sixteenth embodiment, wherein the baseline expected sound is determined based on the sound generated by the speaker.

An eighteenth embodiment can include the method of the sixteenth or seventeenth embodiments, wherein initiating the fit test comprises pressing a button on the mask.

A nineteenth embodiment can include the method of any of the sixteenth through eighteenth embodiments, wherein initiating the fit test comprises receiving a voice command from the user.

A twentieth embodiment can include the method of any of the sixteenth through nineteenth embodiments, further comprising installing an electronics system within the mask configured to complete the fit test, wherein the electronics system comprises at least the speaker, the microphone, the indicator, and the electronics unit.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for completing a fit test on a face mask, the method comprising:

generating, by a speaker, a sound for a predetermined length of time during the fit test, wherein the speaker is installed within an interior cavity of the face mask and is configured to produce the sound within the face mask;

detecting, by a microphone, sound generated by the speaker during the fit test, wherein the microphone is installed within the interior cavity of the face mask and configured to detect the sound within the facemask;

comparing a detected signal from the microphone to a baseline expected sound;

in an instance in which the detected signal is unattenuated with respect to the baseline expected sound, indicating to the user that the fit test is completed and passed; and in an instance in which the detected signal is attenuated with respect to the baseline expected sound, indicating to the user that the fit test is completed and failed.

2. The method of claim 1, further comprising receiving input from the user to start the fit test before the speaker generates the sound.

3. The method of claim 1, further comprising sealing the face mask to a face of the user via a seal located about an outer edge of the face mask.

4. The method of claim 1, wherein generating the sound by the speaker comprises generating the sound for approximately 10 seconds or less.

5. The method of claim 1, wherein generating the sound by the speaker comprises generating the sound for approximately 1 to 5 seconds.

6. Method of claim 1, wherein indicating to the user that the fit test is completed and passed and indicating to the user that the fit test is completed and failed comprises indicating via a colored light attached to an exterior of the mask.

7. The method of claim 1, wherein indicating to the user that the fit test is completed and passed and indicating to the user that the fit test is completed and failed comprises indicating via voice feedback.

8. The method of claim 1, further comprising repeating the method until the fit test is completed and passed.

9. The method of claim 1, further comprising:

detecting, by a second microphone, environmental noise, wherein the second microphone installed on an exterior of the mask; and cancelling detected environmental noise in a detected signal from the second microphone from the detected signal from the first microphone.

10. A respiratory face mask comprising:

at least one filter element configured to filter an airflow into the face mask to generate breathable air for a user;

a seal configured to seal the mask against a face of the user;

at least one speaker located within an interior cavity of the mask configured to generate a sound to complete a fit test for the mask;

at least one microphone located within the interior cavity of the mask configured to detect the sound generated by the at least one speaker during the fit test for the mask, wherein when the sound detected by the microphone is attenuated with respect to a baseline expected sound, the mask is configured to indicate that the fit test has failed; and at least one processor; and at least one memory including computer program code, the at least one memory and the computer program code configured to, with the at least one processor, cause the processor to at least communicate with and control the at least one speaker and at least one microphone to complete the fit test for the mask.

11. The face mask of claim 10, further comprising an indicator located on the exterior of the mask configured to indicate a status of the fit test to the user.

12. The face mask of claim 11, wherein the indicator (106) comprises a colored light attached to the exterior of the mask.

13. The face mask of claim 11, wherein the indicator comprises voice feedback.

14. The face mask of claim 10, wherein the at least one microphone comprises a microphone configured to detect voice commands from the user.

15. The face mask of claim 10, wherein the at least one microphone comprises:

a first microphone located within the interior cavity of the mask; and a second microphone located on an exterior of the mask configured to detect environmental noise, wherein the detection of the second microphone is used to cancel the environmental noise from the detection of the first microphone.

* * * * *